No. 754,499. PATENTED MAR. 15, 1904.
J. H. RANDOLPH.
HORSE RAKE.
APPLICATION FILED AUG. 3, 1903.
NO MODEL.
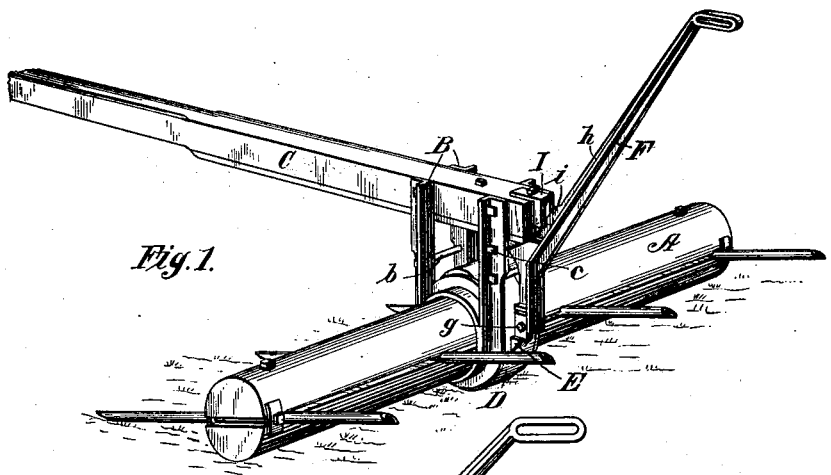
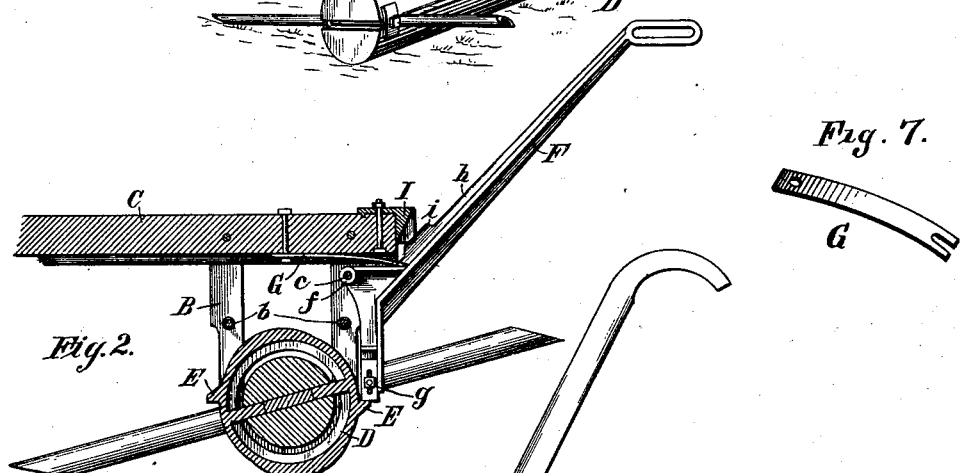
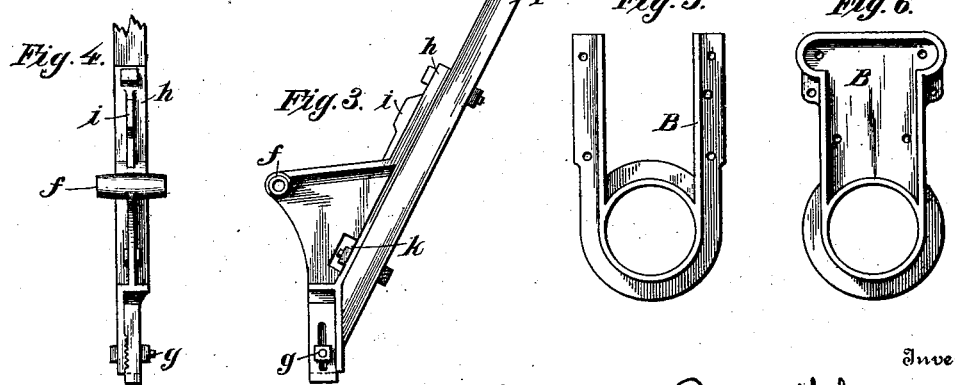
Witnesses
Inventor
John H. Randolph
By Baldwin Davidson & Wright
his Attorneys No. 754,499. Patented March 15, 1904.

UNITED STATES PATENT OFFICE.

JOHN H. RANDOLPH, OF BATON ROUGE, LOUISIANA.

HORSE-RAKE.

SPECIFICATION forming part of Letters Patent No. 754,499, dated March 15, 1904.

Application filed August 3, 1903. Serial No. 168,075. (No model.)

*To all whom it may concern:*

Be it known that I, JOHN H. RANDOLPH, a citizen of the United States, residing at Baton Rouge, in the State of Louisiana, have invented certain new and useful Improvements in Horse-Rakes, of which the following is a specification.

My invention relates to that class of horse-rakes having a series of straight teeth attached to a central shaft and operated by trip mechanism so as to flop over at intervals, thus leaving the hay in ridges and presenting a new series of teeth to the unraked field. Examples of such rakes may be found in my previous Letters Patent No. 208,267, dated September 24, 1878; No. 543,563, dated July 30, 1895, and No. 610,663, dated September 13, 1898. In these patents I show a rake-head surrounded by a circular hub or ring at the center. This hub is provided with wipers or stops. A lever pivoted in an opening in the rear end of the tongue is employed to engage the stop on the hub and hold the teeth in juxtaposition with the surface of the field to be raked. By operating the lever the stops are released whenever desired and the rake flops over. This lever is held in position by a leaf-spring on the top of the tongue. My present invention improves this mechanism by substituting a lever with a web pivoted between the hangers for the rake-head. I improve, further, by putting the detaining-spring on the bottom of the tongue, where it is in a more protected position, also by making the cam-ring more or less oval-shaped, the longer axis being perpendicular in operation, so as to produce more friction, and thus hold the rake-teeth steadier.

The details of construction and the particular points of novelty are hereinafter fully described.

In the accompanying drawings, Figure 1 is a perspective view of a rake bearing my improvement. Fig. 2 is a tranverse section showing the oval cam-ring and the arrangement of lever and spring. Fig. 3 is a detail view, being a side elevation of one form of the operating-lever. Fig. 4 is a front or edge view of the same. Figs. 5 and 6 show different forms of hangers for the rake-head and lever. Fig. 7 is a perspective view of the leaf-spring for holding the operating-lever in position.

The rake-head A may be of any suitable well-known construction and is hung in two down-hangers B, which are attached to each side of the rear end of the tongue C by bolts and are properly spaced apart below by bolts passing through spacing-tubes $b$. These hangers are made, preferably, in one piece and are U-shaped, inclosing in the curve a circle, and the rest of the hanger may be either solid or cut away. In wrought-iron hangers I prefer to have the top part cut away, as in Fig. 5, while to impart the necessary strength to a cast hanger it is made solid, as in Fig. 6. Between these hangers is a cam-ring D around the central portion of the rake-head. The interior of this cam-ring is so fashioned as to be rigidly attached to the rake-head—*e. g.*, as in Patent No. 610,663. Its exterior is oval in shape, the longer axis being substantially at right angles with the plane of the rake-teeth, and has stops or wipers E approximately on the ends of its shorter axis. These stops correspond with the stops in my previous patents and engage with the lever F, which is hung by a bolt $c$, passing through both hangers, and a hollow fulcrum $f$, cast on the lever, or it may be hung by pins fitting in holes in the down-hangers. The lever is in outline somewhat similar to that shown in Patent No. 610,663, above referred to. The length of the lower engaging arm is adjustable through a bolt $g$. The lever has on its upper arm a web $h$, with a projection $i$, adapted to fit in a guide-box I on the tongue. This projection keeps the lever in the correct vertical plane and also limits the throw of the lever to just the amount required for the lower end to escape the stops E. The lever may be cast in one piece, in which case it will have reinforcing-webs throughout its length and a slotted handle, (shown in Figs. 1 and 2,) or it may consist of a casting of the lower arm and part of the upper arm bolted to a wooden handle, as in Figs. 3 and 4. In the latter case an aperture $k$ will be left in the triangular web near the fulcrum for the nut of a bolt passing through the wooden handle.

The lever is held in position by a leaf-spring G, bolted to the under side of the tongue, its free end being toward the rear. This end is slotted to fit the web *h* on the lever, being thus held in position. It is so bent that it bears upon the surface of the lever and keeps the lower end in contact with the stops on the cam-ring.

The operation of the rake is similar to that described in my former patents. When the operating-lever is in engagement with the stops, as shown in Figs. 1 and 2, the teeth will be held in juxtaposition with the surface of the field to be raked, and the hay, &c., will be collected as the machine advances; but when the handle of the lever is raised the stops on the cam-ring are released and the teeth will dig into the ground or hay, and the rake will flop over and drop the load, when the other stop will be engaged by the released lever and present the other set of teeth to the unraked field.

By making the cam-ring oval I produce more friction on its sliding surface, thus holding the teeth very close to the surface of the field and gathering all the hay, &c. By hanging the lever below the tongue between the hangers and by having a web fitting into the slotted end of the spring and fitting into the guide-box I get a much more rigid adjustment of the lever than formerly. By putting the spring in a sheltered position I increase its life.

I claim as my invention and desire to secure by Letters Patent—

1. The combination of an intermittently-revolving rake-head, an oval cam-ring thereon and having its major axis arranged vertically, stops on the ring, a lever engaging said stops at intervals to hold the rake-teeth down, and teeth projecting through the rake-head at right angles to the major axis of the ring.

2. The combination of a tongue, down-hangers on each side thereof, a rake-head turning in bearings in the down-hangers, rake-teeth projecting through the rake-head, an oval cam-ring secured to the rake-head between said down-hangers, and having its major axis arranged perpendicularly to the plane of the teeth, stops on the cam-ring and a lever engaging said stops.

3. The combination of a tongue, down-hangers thereon, a turning rake-head in the hangers, a cam-ring on the rake-head, a lever rocking on a pivot in the down-hangers below the tongue, and engaging stops on the cam-ring.

4. The combination of a tongue, down-hangers thereon, a turning rake-head, an oval cam-ring thereon, stops on the cam-ring, a lever rocking vertically on a pivot on the down-hangers below the tongue, and a leaf-spring secured at one end to the tongue having its free end interposed between the tongue and the lever to hold the lever and stops in contact.

5. The combination of a tongue, down-hangers thereon, a rake-head turning in the down-hangers, an oval cam-ring on the rake-head, stops on the cam-ring, a lever engaging said stops, a guide-box for the lever on the rear end of the tongue, and rake-teeth projecting through the rake-head and disposed at right angles to the major axis of the cam-ring.

6. The combination of a tongue, down-hangers thereon, a rake-head turning in the down-hangers, an oval cam-ring on the rake-head, stops on the cam-ring, a lever engaging said stops, a guide-box for the lever, and a projection of the web of the lever meshing in the guide-box, and teeth projecting from the rake-head and disposed at right angles to the major axis of the cam-ring.

In testimony whereof I have hereunto subscribed my name.

JOHN H. RANDOLPH.

Witnesses:
A. J. RONALDSON,
JNO. JORDAN.